(12) United States Patent
Natsume

(10) Patent No.: US 7,724,181 B2
(45) Date of Patent: May 25, 2010

(54) TARGET OBJECT DETECTION APPARATUS FOR ACQUIRING INFORMATION CONCERNING TARGET OBJECTS BASED ON CORRELATION MATRIX DERIVED FROM SIGNAL VALUES CORRESPONDING TO REFLECTED ELECTROMAGNETIC WAVES

(75) Inventor: Kazuma Natsume, Oobu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/456,351

(22) Filed: Jun. 16, 2009

(65) Prior Publication Data

US 2009/0309784 A1    Dec. 17, 2009

(30) Foreign Application Priority Data

Jun. 17, 2008  (JP)  ............... 2008-158231

(51) Int. Cl.
  G01S 13/42   (2006.01)
(52) U.S. Cl. .................. 342/108; 342/70; 342/103; 342/115; 342/145; 342/189; 342/192; 342/196
(58) Field of Classification Search ............. 342/70–72, 342/103, 107, 108, 111–113, 115, 116, 128, 342/133, 135, 139, 145–147, 189, 192, 195–196
See application file for complete search history.

(56) References Cited

U.S. PATENT DOCUMENTS

| | | | | |
|---|---|---|---|---|
| 4,338,603 A | * | 7/1982 | Magorian | .................. 342/189 |
| 5,184,135 A | * | 2/1993 | Paradise | .................... 342/149 |
| 5,578,933 A | * | 11/1996 | Nonaka | ....................... 324/639 |
| 6,504,490 B2 | * | 1/2003 | Mizushima | .................. 340/943 |
| 6,856,278 B2 | * | 2/2005 | Nakanishi et al. | ........... 342/128 |
| 2003/0128154 A1 | * | 7/2003 | Nakanishi et al. | ........... 342/107 |
| 2006/0007036 A1 | * | 1/2006 | Natsume et al. | ............... 342/70 |
| 2007/0008210 A1 | * | 1/2007 | Kibayashi et al. | ............. 342/70 |
| 2008/0048906 A1 | * | 2/2008 | Suzuki et al. | ................. 342/70 |
| 2008/0224918 A1 | * | 9/2008 | Shimizu | ..................... 342/147 |
| 2009/0040097 A1 | * | 2/2009 | Sakamoto et al. | ........... 342/118 |
| 2009/0309784 A1 | * | 12/2009 | Natsume | ..................... 342/189 |

FOREIGN PATENT DOCUMENTS

DE   102006036099 A1 *  2/2007

(Continued)

OTHER PUBLICATIONS

"New Development of Adaptive Antenna" by Ohm Co.; Adaptive Antenna Technology; Oct. 10, 2003, first edition; pp. 114-120 and p. 142.

*Primary Examiner*—John B Sotomayor
(74) *Attorney, Agent, or Firm*—Harness, Dickey & Pierce, PLC

(57) ABSTRACT

A target object detection apparatus periodically executes a transmit/receive operation to transmit radar waves and obtain received signals from resultant incident reflected waves from respective target objects. An individual correlation matrix of received signal values is derived for each one of a fixed plurality of successive transmit/receive operations, with the transmission frequency being changed at successive operations. Individual correlation matrices derived from respective transmit/receive operations are time-averaged to obtain an average correlation matrix for use in obtaining target object information such as direction or velocity, with effects of correlation between respective incident waves being suppressed.

9 Claims, 13 Drawing Sheets

FOREIGN PATENT DOCUMENTS

| | | |
|---|---|---|
| JP | 2001-091617 | 4/2001 |
| JP | 2007-040806 | 2/2007 |
| JP | 2007040806 A * | 2/2007 |
| JP | 2007178372 A * | 7/2007 |
| JP | 2007232385 A * | 9/2007 |

* cited by examiner (a)

(b)

(a)

(b)

(a)

(b)

(a)

(b)

TARGET OBJECT DETECTION APPARATUS FOR ACQUIRING INFORMATION CONCERNING TARGET OBJECTS BASED ON CORRELATION MATRIX DERIVED FROM SIGNAL VALUES CORRESPONDING TO REFLECTED ELECTROMAGNETIC WAVES

CROSS-REFERENCE TO RELATED APPLICATIONS

This application is based on and incorporates herein by reference Japanese Patent Application No. 2008-158231 filed on Jun. 17, 2008.

BACKGROUND OF THE INVENTION

1. Field of Application

The present invention relates to an apparatus for detecting information relating to target objects that are scanned by electromagnetic waves, with the detection based upon a correlation matrix derived from received signals which correspond to reflected waves from the target objects.

2. Description of Related Art

A target object detection method referred to as the super-resolution method is known, which utilizes an array antenna formed of a plurality of antenna elements for estimating respective incoming directions of a plurality of electromagnetic waves that are incident on the antenna. The method is based on a correlation matrix which expresses correlation between respective received signals of the antenna elements, with the correlation matrix being used to generate an angular spectrum which relates received signal (power) values to angular directions (e.g., in azimuth), by methods which are well known in this field of technology. By analyzing the angular spectrum, the required directions of the received incident waves can be measured to a high degree of resolution.

To achieve accurate discrimination between directions of incident waves with such a method, it is necessary that correlation does not exist between the respective incident waves which arrive along these directions. For example in the case of a vehicle-installation radar apparatus which employs such a method to detect preceding vehicles and roadside objects, if all of these vehicles and objects (and the vehicle containing the radar apparatus, with that vehicle referred to in the following as the local vehicle) are stationary, that is to say, if there is no relative motion of theses target objects, then there will be strong correlation between respective radar waves which are reflected from these various target object and are received at the antenna of the radar apparatus of the local vehicle.

The term "relative motion of target objects", as used herein, is to be understood as motion with respect to a radar apparatus which receives reflected radar waves from these target objects.

Spatial averaging methods are known which can suppress such correlation. This is achieved by using a plurality of sub-arrays, which each constitute a part of the receiving antenna of a radar apparatus, with each sub-array formed of a plurality of antenna elements. Respective values of concurrently received signals from the antenna elements of each sub-array are used to derive a correlation matrix corresponding to that sub-array, and the respective correlation matrices thus obtained are averaged, to obtain an average correlation matrix. Such a spatial averaging method is described for example in "Adaptive Antenna Technology", Ohm Co., (Japan), 10 Oct. 2003, first edition, pages 114, 142, designated in the following as reference 1.

The phase relationship between a set of received incident waves having high correlation will differ in accordance with the physical positions at which the waves are received. Thus, by averaging respective correlation matrices that are derived from concurrently received signals of a plurality of sub-arrays located at respectively different positions, an average correlation matrix can be obtained in which the correlation between respective incident received waves is suppressed.

With that method, when such incident waves are received (as reflected waves from respective target bodies) in a transmit/receive operation, a set of data (generally referred to as a snapshot) to constitute a vector referred to as a received vector are obtained from the respective received signals of the antenna elements of a sub-array. The received vector is used to calculate a corresponding correlation matrix, i.e., a plurality of correlation matrices respectively corresponding to the sub-arrays are derived in each transmit/receive operation and are used to obtain an average correlation matrix.

However with that method, in order to attain a sufficient degree of suppression of correlation between respective received waves, it is necessary to use a large number of snapshots, i.e., it is necessary to use a large number of sub-arrays to obtain a sufficient number of covariance matrices for use in the averaging processing. Furthermore, with the spatial averaging method, the number of directions of incidence of received waves that can be detected is determined by the number of dimensions of a correlation matrix. That number of dimensions is determined by the number of antenna elements of each sub-array.

Hence such a method has the disadvantage that, by comparison with a conventional radar apparatus that is capable of detecting the same number of directions of incident waves, the number of antenna elements (and hence the overall size of the radar apparatus) becomes substantially greater.

For that reason, a method which applies time-domain averaging of correlation matrixes has been proposed. That method would be applicable for example to a vehicle-installation radar apparatus having a receiving antenna which is an array antenna, and which detects target objects by repetitive transmit/receive operations of transmitting electromagnetic waves and obtaining received signals from resultant reflected waves. Such a method is described for example in reference 1 above and in Japanese patent publication No. 2007-40806 (referred to in the following as reference 2). At each of these transmit/receive operations, a correlation matrix is obtained from the received signals of the respective antenna elements (i.e., of the entire array antenna). Correlation matrices are thereby successively obtained. A predetermined number of successive correlation matrices are averaged (time-averaged) to obtain an average correlation matrix, with this averaging operation being repetitively performed. Each average correlation matrix is used to detect the respective directions of incidence of received waves, as described above for the case of spatial averaging.

However a basic problem of such a known type of time-domain averaging method is as follows. When it is required to detect the incoming directions of reflected waves from one or more target objects which are each stationary with respect to the radar apparatus, it is not possible to achieve a sufficient degree of suppression of the correlation between the received incident waves. Hence, the resolution of direction detection is low.

SUMMARY OF THE INVENTION

It is an objective of the present invention to overcome the above problems, by providing a target object detection apparatus having an array antenna for receiving incident waves, whereby enhanced accuracy is achieved in detecting each of a plurality of target objects even if these objects are stationary with respect to the target object detection apparatus, without requiring an increase in the number of antenna elements constituting the array antenna by comparison with a prior art type of apparatus.

To achieve the above objective, the invention provides a target object detection apparatus for deriving target object information relating to one or more target objects, with the apparatus basically comprising transmitting and receiving circuitry, correlation matrix generating circuitry, and target object information detection circuitry. The transmitting and receiving circuitry repetitively executes transmit/receive operations of transmitting scanning electromagnetic waves (radar waves) and obtaining received signals based on reflected waves respectively reflected from the target object(s). The correlation matrix generating circuitry successively generates individual correlation matrices based on the received signals, with each individual correlation matrix being generated based on information acquired from successive ones of a fixed plurality of transmit/receive operations. Each time that information has been acquired from a complete one of these sequences, an average correlation matrix is calculated, as a time-average of the individual correlation matrices that have been obtained from the sequence. The target object information detection circuitry then derives the required the target object information, by a calculation based upon the average correlation matrix.

The invention is characterized in that, in at least one of the transmit/receive operations of such a sequence, the frequency of the transmitted scanning electromagnetic waves is made different from respective values of the frequency during each of the other transmit/receive operations of the sequence.

As a result, the effects of correlation between respective incident radar waves that are reflected from different target objects are effectively suppressed, in the average correlation matrix. The average correlation matrix can thus be applied to derive target object information to a high degree of resolution and accuracy, even when a target object is motionless with respect to the target object detection apparatus.

When the required target object information consists of respective relative directions of target objects, the transmitting and receiving circuitry can comprise an array antenna having a plurality of antenna elements, with a plurality of received signals being obtained via respective channels corresponding to the antenna elements. In that case, the correlation matrix generating circuitry can be configured to calculate each of the individual correlation matrices based on a received vector whose elements are respective concurrent values of received signals corresponding to the various channels. The target object information detection circuitry is configured to calculate the relative directions of the target objects based upon an average correlation matrix that is derived from a set of successively obtained individual correlation matrices. For example, the eigenvalues of the average correlation matrix may be applied to the MUSIC (Multiple Signal Classification) algorithm, to obtain an angular spectrum in which peaks correspond to respective directions of target objects from which radar waves are reflected. The MUSIC algorithm serves as an algorithm for one of super-resolution techniques.

High resolution of detecting respective relative directions of a plurality of target objects can thereby be achieved, even if the target objects are stationary with respect to the target object detection apparatus, and without requiring an increased number of antenna elements in the array antenna.

Alternatively, when the required target object information consists of relative velocity values of one or more target objects from which reflected radar waves are received, the correlation matrix generating circuitry is configured to generate each of the individual correlation matrices based on a received vector whose element consist of a fixed plurality of time-sequential values of a received signal that is obtained from a receiving antenna during a transmit/receive operation. In addition, the target object information detection circuitry is configured to calculate the relative velocities of the target objects based upon each average correlation matrix that is obtained from a fixed sequence of transmit/receive operations. With such an apparatus, the frequency of transmitted radar waves held fixed (i.e., CW transmission) during each transmit/receive operation, with the frequency being successively changed for each transmit/receive operation of the aforementioned fixed plurality of successive transmit/receive operations.

A high accuracy of detecting the relative velocities of one or more target objects can thereby be achieved.

The invention is applicable to various types of radar apparatus, i.e., to an apparatus of FMCW (frequency-modulation continuous-wave) type, which transmits a frequency-modulated carrier wave, a CW (continuous-wave) type of apparatus, which transmits an unmodulated carrier wave, or to a pulse radar apparatus which transmits a periodically interrupted carrier wave.

DESCRIPTION OF PREFERRED EMBODIMENTS

First Embodiment

Figure 1:
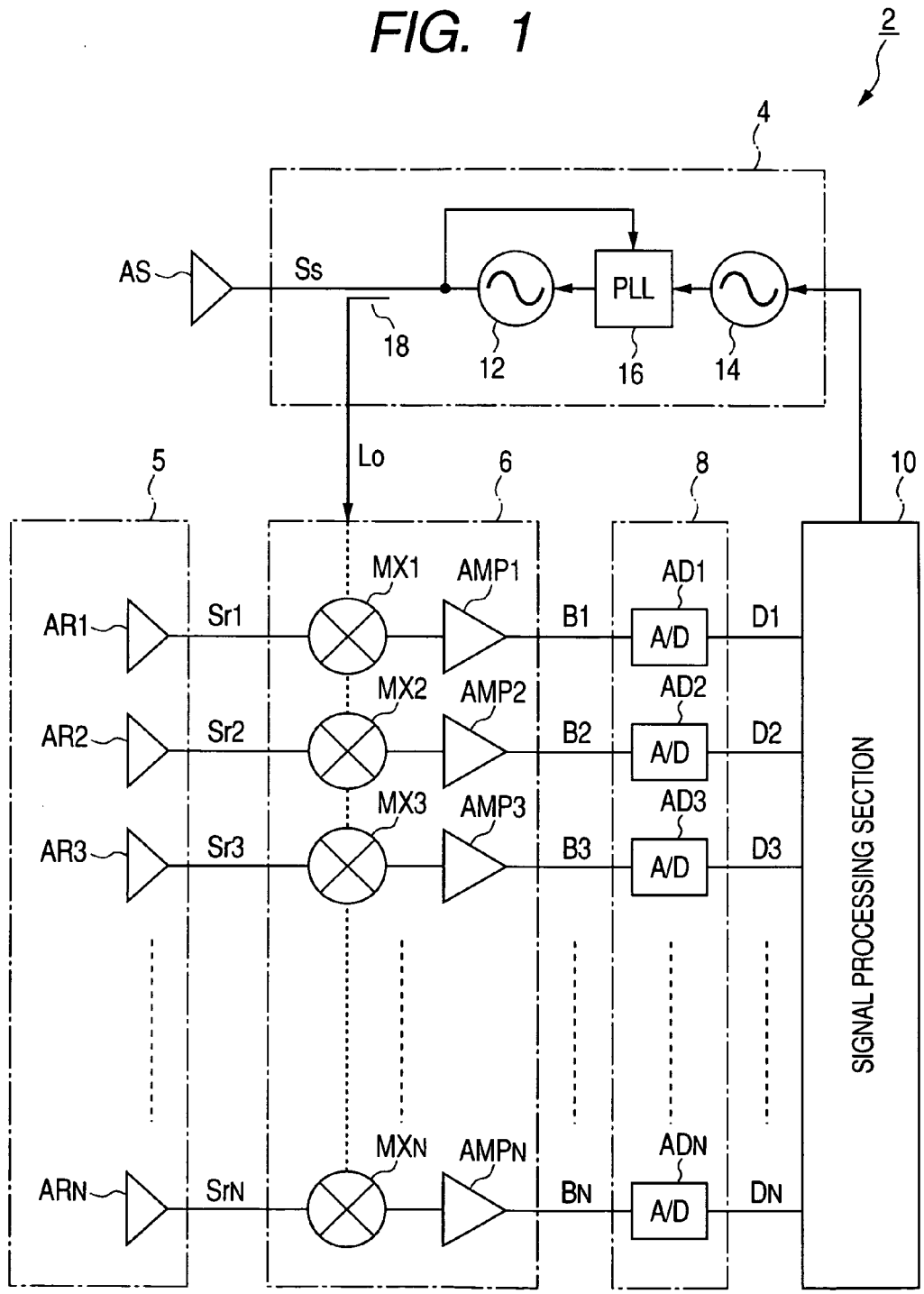
FIG. 1 is a system block diagram showing the overall configuration of a first embodiment of a vehicle-installation radar apparatus.

FIG. 1 is a block diagram showing the overall configuration of an embodiment of a vehicle-installation radar apparatus, designated by numeral 2. As shown, the radar apparatus 2 includes a transmitter 4, a receiving array antenna 5, a receiver 6, a A/D converter section 8 and a signal processing section 10, together with a single-element transmitting antenna designated as AS. The transmitter 4 generates a frequency-modulated high-frequency transmission signal which is supplied to the transmitting antenna AS, for transmitting electromagnetic waves (radar waves) in the millimeter waveband. The receiving array antenna 5 is formed of a set of N antenna elements $AR_1$ to $AR_N$ arrayed at equidistant spacings. The receiver 6 is supplied with high-frequency received signals $Sr_1$ to $Sr_N$ from the N antenna elements $AR_1$ to $AR_N$ respectively, resulting from reflected radar waves that are incident on these antenna elements, i.e., waves which have been transmitted from the antenna AS and reflected back from preceding vehicles, roadside objects, etc. The receiver 6 converts these received signals $Sr_1$ to $Sr_N$ to respectively corresponding beat signals $B_1$ to $B_N$ as described hereinafter. The A/D converter section 8 is made up of N A/D converters $AD_1$ to $AD_N$ which respectively receive the beat signals $B_1$ to $B_N$ from the receiver 6 and convert these to respectively corresponding sequences of digital sample values, which are supplied to the signal processing section 10. The digital sample values respectively corresponding to the beat signals $B_1$ to $B_N$ are referred to in the following as data values $D_1$ to $D_N$.

The signal processing section 10 performs various processing operations based upon the data values $D_1$ to $D_N$.

As shown, the transmitter 4 includes a high-frequency oscillator 12, a reference signal generating circuit 14, a PLL (phase lock loop) and a signal splitter 18. The high-frequency oscillator 12 generates a frequency-modulated high-frequency (millimeter-waveband) signal, i.e., carrier signal, at a frequency controlled by a control signal supplied from the PLL 6. The reference signal generating circuit 14 generates a frequency-modulated reference signal which varies about a center frequency that is within an intermediate-frequency range of approximately several hundred kHz to several MHz, with the reference signal frequency being alternately swept linearly upward and downward within a fixed-size range, and with the center frequency of the range being designated by commands supplied from the signal processing section 10.

The PLL 6 frequency-divides the high-frequency output signal from the high-frequency oscillator 12 and compares the phase of the frequency-divided signal with that of the reference signal from the reference signal generating circuit 14, and generates the control signal for controlling the high-frequency oscillator 12 to hold the frequency-divided signal in phase coincidence with the reference signal.

The splitter 18 divides the output signal from the high-frequency oscillator 12 into the transmission signal (frequency-modulated carrier) Ss which is supplied to the transmitting antenna AS, and a local oscillator signal Lo which is supplied to the receiver 6.

Figure 3:
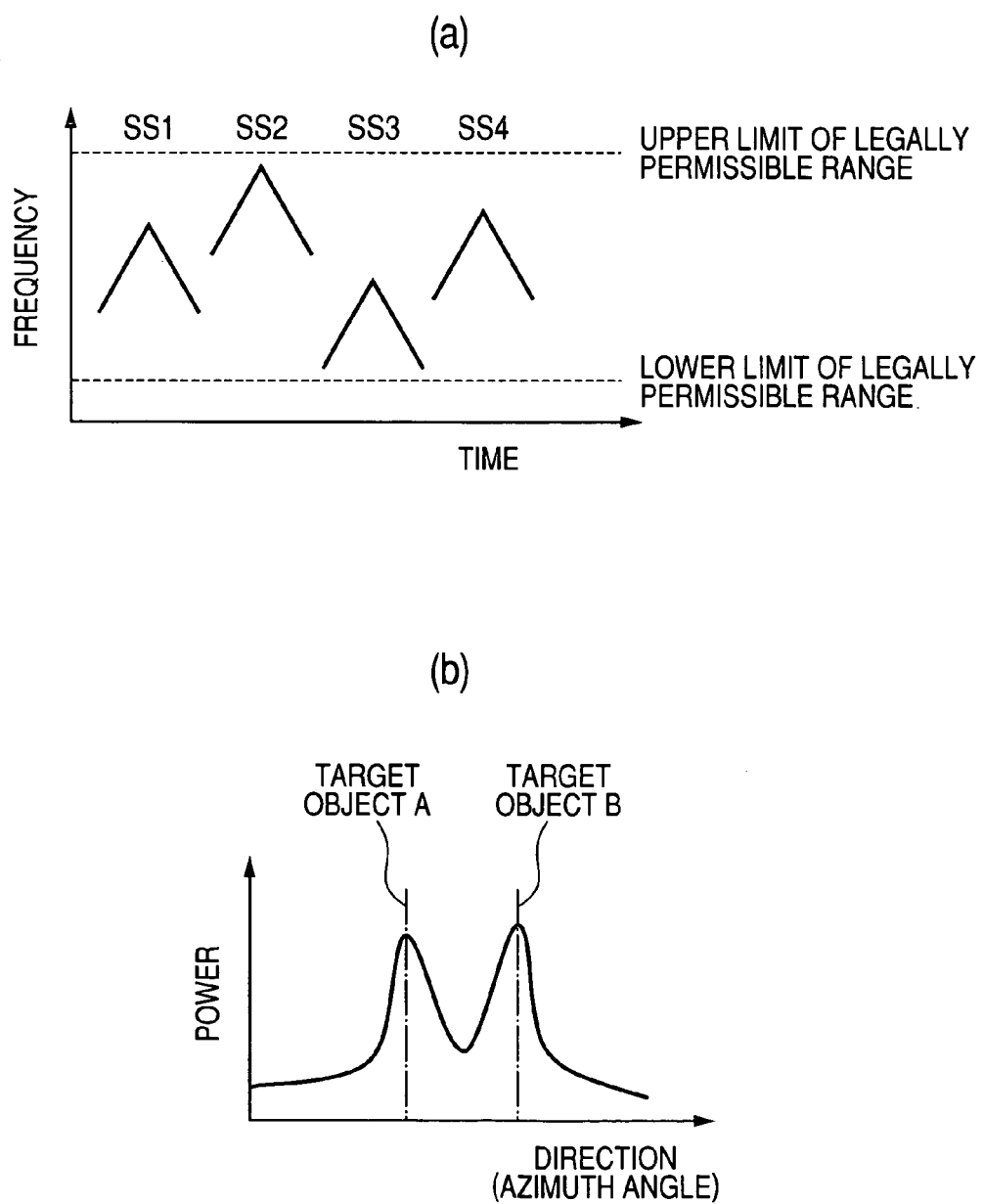
FIG. 3 illustrates successive changes in transmitted radar wave frequency, with the first embodiment, and shows an example of an angular direction spectrum derived based on the MUSIC algorithm, for detecting respective directions of target objects with the first embodiment.

With this embodiment a sequence of four successive transmit/receive operations, i.e., four successive modulation intervals, constitute a data collection operation in which information (direction, distance, relative velocity) is obtained concerning one or more target objects, with the data collection operations being repeated at periodic intervals. In each modulation interval, the reference signal generating circuit 14 sweeps the reference signal within one of four frequency ranges having respectively different center frequencies, with each center frequency being designated by the signal processing section 10. The high-frequency transmission signal Ss is thereby accordingly frequency-modulated, with the frequency of the transmitted radar waves being alternately increased and decreased in four different frequency ranges (i.e., having respectively different center frequencies). These are contained within the upper and lower limits of a legally permissible transmission frequency range, as illustrated in FIG. 3A. The respective sets of data values $D_i$ that are acquired from a sequence of four modulation intervals (i.e., four successive pairs of upward/downward frequency sweeps) are referred it in the following as the snapshots SS1 to SS4.

The receiver 6 includes a set of N mixers $MX_1$ to $MX_N$ (collectively designated as $MX_i$ in the following) and N amplifiers $AMP_1$ to $AMP_N$ (collectively designated as $AMP_i$ in the following). The mixers $MX_i$ mix the received signals $Sr_i$ respectively obtained from the antenna elements $AR_i$ with the local oscillator signal Lo, to generate respective beat signals $B_i$, each having a frequency that is the difference between the corresponding received signal $Sr_i$ and the local oscillator signal Lo. The amplifiers $AMP_i$ amplify the respective beat signals $B_i$ and remove unwanted frequency components.

In the following, each combination of a mixer $MX_i$, amplifier $AMP_i$ and A/D converter $AD_i$ which successively operate on a received signal $SR_i$ from an antenna element $AR_i$ will be collectively referred to as the receiving channel $CH_i$, where i is a channel identifier in the range 1 to N.

The transmitting antenna AS transmits FMCW (frequency modulation continuous-wave) radar waves when driven by the frequency-modulated high-frequency transmission signal Ss. When resultant reflected waves are received by the receiving array antenna 5, the resultant received signals SR are operated on by the corresponding mixers $MX_i$ and amplifiers $AMP_i$ to obtain the corresponding beat signals $B_i$. Each beat signal is sampled at periodic sampling intervals by the corresponding one of the A/D converters $AD_i$ to be converted into a train of digital sample values, i.e., the data values $D_i$.

Signal Processing Section

The signal processing section 10 is based on a usual type of microcomputer, i.e., having a CPU, ROM, RAM, etc. The signal processing section 10 also includes a DSP (digital signal processor) which executes FFT (fast Fourier transform) operations, and an input port for receiving data from the A/D converter section 8.

The signal processing section 10 repetitively executes a target object information generating processing routine at periodic intervals, with the processing based on data of the four successive snapshots SS1 to SS4 corresponding to a sequence of four modulation intervals. The processing is executed to obtain information specifying the respective directions (with this embodiment, azimuth bearings) of one or more target objects from which radar waves are reflected, and also the respective distances and velocities of these target objects relative to the radar apparatus 2.

Figure 2:
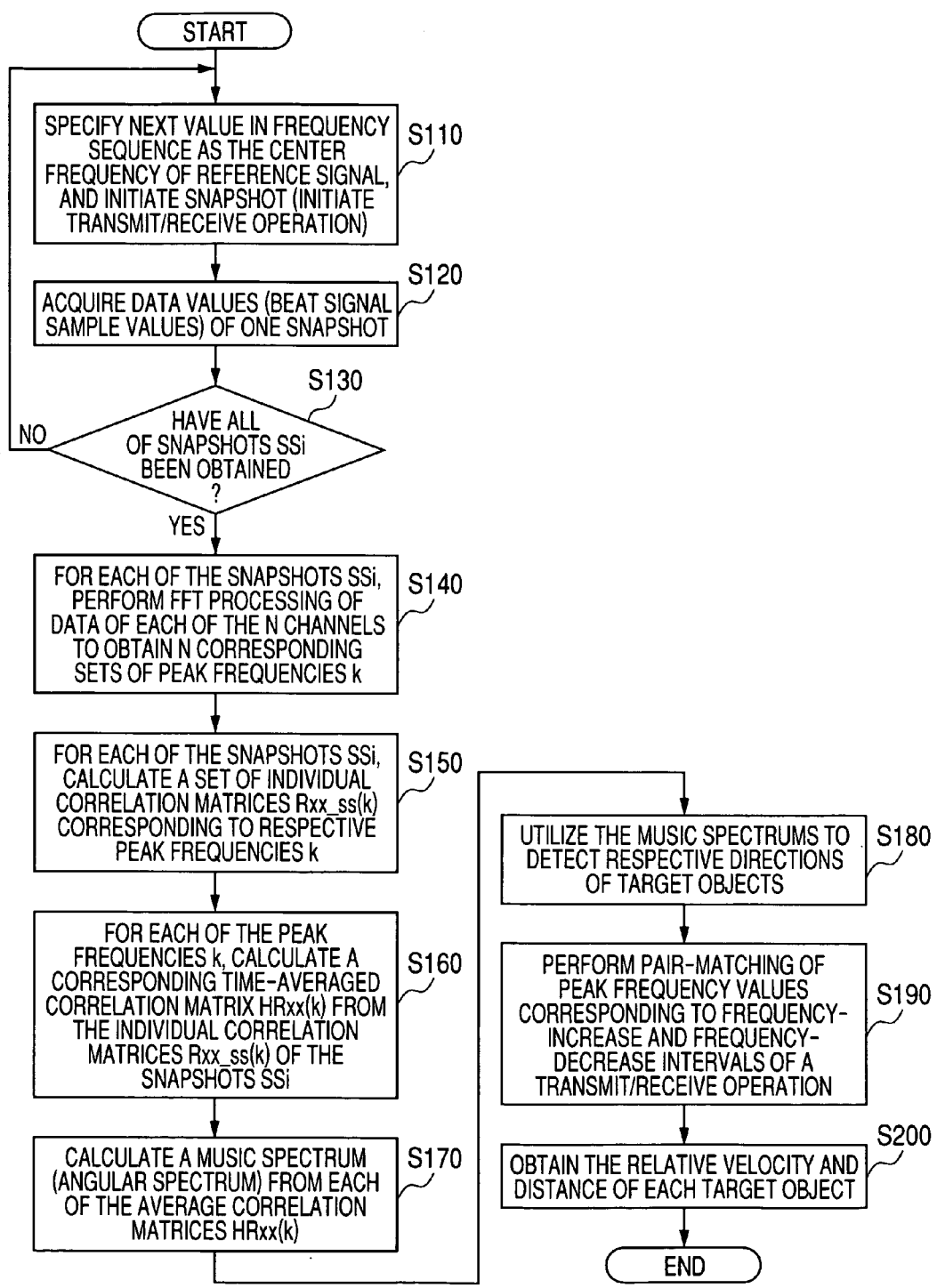
FIG. 2 is a flow diagram showing processing executed by the first embodiment for detecting respective directions of target objects.

FIG. 2 is a flow diagram of the target object information generating processing routine. Firstly in step S110, a command is sent to the reference signal generating circuit 14 for initiating an upward/downward frequency sweep of the reference signal (i.e., initiating a modulation interval in which a transmit/receive operation is executed to acquire data of one snapshot), with that command specifying the center frequency of the reference signal frequency sweep range, and thereby determined the center frequency of a transmission signal frequency sweep range. Each time step S110 is performed, the specified center frequency is changed. With this embodiment, a fixed sequence of four different center frequencies is performed in each execution of the processing routine of FIG. 2. However it should be noted that it would be also possible to randomly vary these successive frequency values.

In step S120, the digital data values obtained by sampling the received beat signal during one modulation interval (data of one snapshot) are temporarily stored in memory. In step S130 a decision is made as to whether a complete sequence of four successive snapshots has been obtained (i.e., whether the four different center frequency values that can be selected by the signal processing section 10 have been successively specified).

If there is a NO decision in step S130 then operation returns to step S110, to collect data of a succeeding snapshot. If there is a YES decision in step S130, indicating that data values $D_i$ of a complete sequence of four snapshots have been collected, step S140 is executed.

In step S140, FFT processing is applied to the collected data values, with the processing being applied respectively separately to the sets of data values that have been obtained for each of the channels $CH_1$ to $CH_N$, for each of the snapshots, and for each of the upward-sweep and downward-sweep frequency modulation intervals of each snapshot, i.e., with this embodiment, a total of eight FFT processing operations being executed for a set of four successively obtained snapshots, with a corresponding frequency spectrum being obtained from each FFT operation.

The term "peak frequency", of a FFT spectrum derived from a sampled beat signal, is used herein with the following significance. When a pair of peak values (such a pair being referred to herein as a common peak) having a common center frequency occur in all of the FFT spectrums obtained for both the upward-sweep and downward-sweep intervals of each modulation interval, for each of the snapshots of a sequence SSi (where i is a snapshots identifier, in the range 1 to 4), and for each of the channels, the common center frequency is designated as a peak frequency k. The term "peak value" here signifies a local maximum in a spectrum, having an amplitude (peak amplitude) that is greater than a predetermined minimum value. For each of the snapshots SSi (if one or more target objects are being detected), one or more sets of N peak amplitudes is/are obtained. These sets correspond to respective peak frequencies k, with the N values of each set corresponding to respective channels. Each peak frequency k corresponds to a specific component frequency of a beat signal.

N peak amplitude values that are respectively obtained from the beat signals of the N channels by the FFT processing will be designated as $x_1(k) \sim x_N(k)$.

For each of the snapshots SSi, the set of N peak amplitude corresponding to a specific peak frequency k are arrayed as a corresponding received vector Xi(k), expressed by equation (1) below.

In step S150, individual correlation matrixes Rxx_ssi(k), each corresponding to a specific peak frequency k, and corresponding to the respective snapshots SSi, are then calculated from the received vectors Xi(k) obtained for each channel, as expressed by equation (2) below. If the number of snapshots SSi is four as with this embodiment, then for each peak frequency, a corresponding set of four individual correlation matrixes Rxx_ssi(k) (each having N×N dimensions) corresponding to four successive time-axis positions are obtained from a sequence of snapshots SSi.

$$Xi(k) = \{x_1(k), x_2(k), \ldots, x_N(k)\}^T \quad (1)$$

$$Rxx\_ssi(k) = Xi(k)Xi^H(k) \quad (2)$$

Next in step S160 (for each peak frequency k), an average correlation matrix HRxx(k) corresponding to that peak frequency k is calculated by averaging (time-averaging) the individual correlation matrixes Rxx_ssi(k) corresponding to that peak frequency k, which have been obtained from respective snapshots SSI. This expressed by equation (3) below.

$$HRxx(k) = \frac{1}{4}\sum_{i=1}^{4} Rxx\_ssi(k) \quad (3)$$

In step S170, (for each peak frequency k) the corresponding average correlation matrix HRxx(k) is analyzed to obtain its eigenvalues. The number L of eigenvalues which exceed a predetermined noise level is then estimated (i.e., the number of eigenvalues corresponding to respective incident radar waves which arrive along different directions) to thereby obtain the remaining eigenvalues Eno expressed by equation (4) below, which correspond to the noise space.

The noise-space eigenvalues Eno and the incident wave number L are then applied to obtain a MUSIC (Multiple Signal Classification) evaluation function $P_{MU}(\theta)$ expressed by equation (5) below.

$$E_{NO} = \{e_{L+1}, e_{L+2}, \ldots, e_N\} \quad (4)$$

$$P_{MU}(\theta) = \frac{a^H(\theta)a(\theta)}{a^H(\theta)E_{NO}E_{NO}^H a(\theta)} \quad (5)$$

Application of the MUSIC algorithm to target object direction detection based on a receiving array antenna is well documented, so that detailed description is omitted herein.

In step S180, a null scan using the evaluation function $P_{MU}(\theta)$ is performed, to obtain an angular direction spectrum expressing (as peak values of power) respective directions of incident waves being received by the antenna elements $AR_1$ to $AR_N$. The (azimuth) directions of respective target objects are thereby detected.

As can be understood from the above, when a plurality of peak frequencies k are detected, the processing of steps S170 and S180 is executed separately for each of these peak frequencies k, to obtain average correlation matrices HRxx(k) respectively corresponding to the peak frequencies k.

Figure 12A:
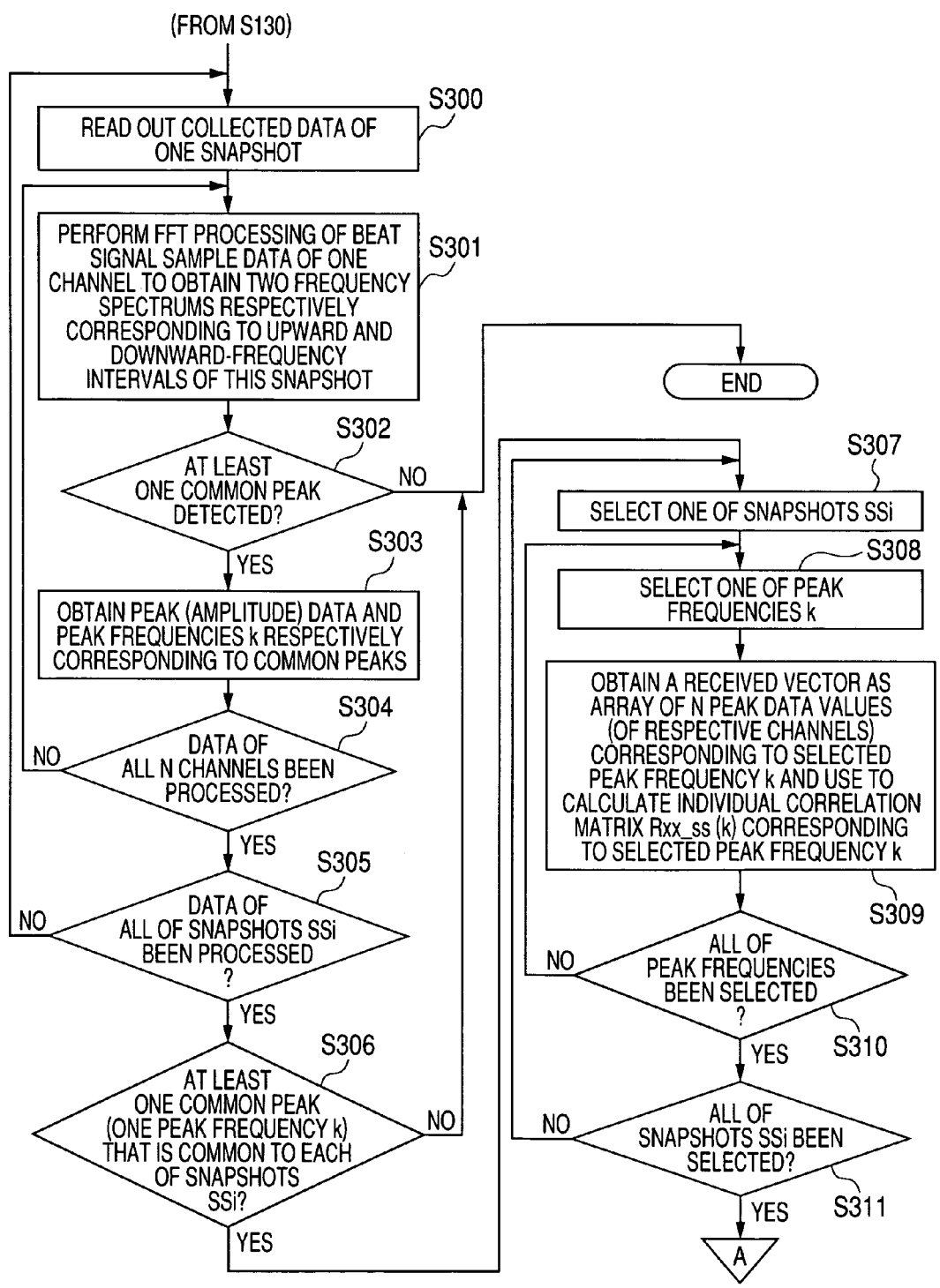
Figure 12B:
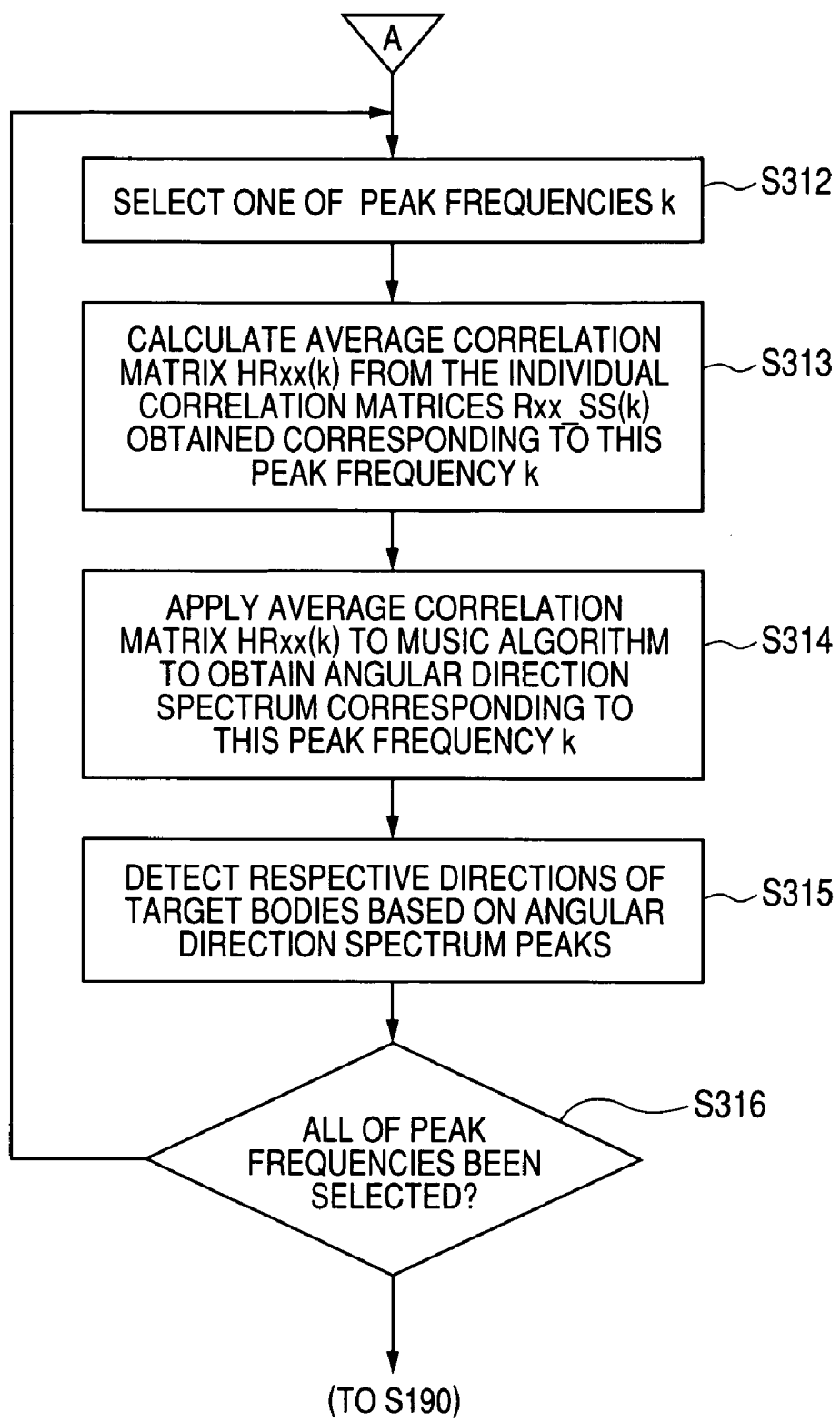

FIGS. 12A and 12B constitute a flow diagram showing details of the processing executed in steps S140 to S180 of FIG. 2. FIGS. 12A, 12B are related to steps S140 to S180 of FIG. 2 as follows:

steps S300 to S306 correspond to step S140;
steps S307 to S311 correspond to step S150;
steps S312 to S313 correspond to step S160;
step S314 corresponds to step S170; and,
step S315 corresponds to step S180.

It should be noted that the invention is not limited to deriving an angular direction spectrum from an average correlation matrix HRxx(k) by using the MUSIC algorithm to obtain an evaluation function such as $P_{MU}(\theta)$, and that other methods could be utilized, for example as described in reference 1 above. The essence of the above embodiment resides in time-averaging of sequentially obtained individual correlation matrixes, to derive an average correlation matrix HRxx(k), in which correlation between respective incident waves having different directions of arrival is suppressed even when the target objects have no relative motion.

Next in step S190, pair matching processing is performed. Specifically, when a plurality of peak frequencies k have been detected, each of respective pairs of these peak frequencies is examined in conjunction with the incident wave directions that have been derived corresponding to these peak frequencies. If a pair is found for which the corresponding derived incident wave directions differ by less than a predetermined extent, then the pair are assumed to correspond to a single detected target object.

In step S200, the respective distances and relative velocities of the detected target objects are calculated and outputted. Methods of deriving target object distance and velocity information using a FMCW radar apparatus are well known, so that description is omitted. This execution of the processing routine is then ended.

With the radar apparatus 2 of this embodiment as described above, each time a transmit/receive operation is executed and a new snapshot is thereby obtained, one or more individual correlation matrices Rxx(k) corresponding to one or more peak frequencies k are derived. For each peak frequency k, four individual correlation matrixes Rxx(k) are obtained from a snapshot sequence SSi, and an average correlation matrix HRxx(k) corresponding to that peak frequency k is thereby calculated by time-averaging. During a snapshot sequence SSi, the frequency ranges of the respective FM (upward/downward) sweeps are of identical extent but have respectively different center frequencies for successive snapshots.

The effects of the invention are basically obtained as follows. Even if there is a strong correlation (i.e., substantially fixed phase relationship) between respective radar waves that are incident on the receiving antenna during one modulation interval (one transmit/receive operation), the phase relationships during time-sequential modulation intervals are respectively different. Thus by averaging individual correlation matrices which correspond to different time-axis positions, a correlation matrix (average correlation matrix) can be obtained in which the effects of fixed phase relationship between incident radar waves during each individual snapshot are suppressed.

Figure 4:
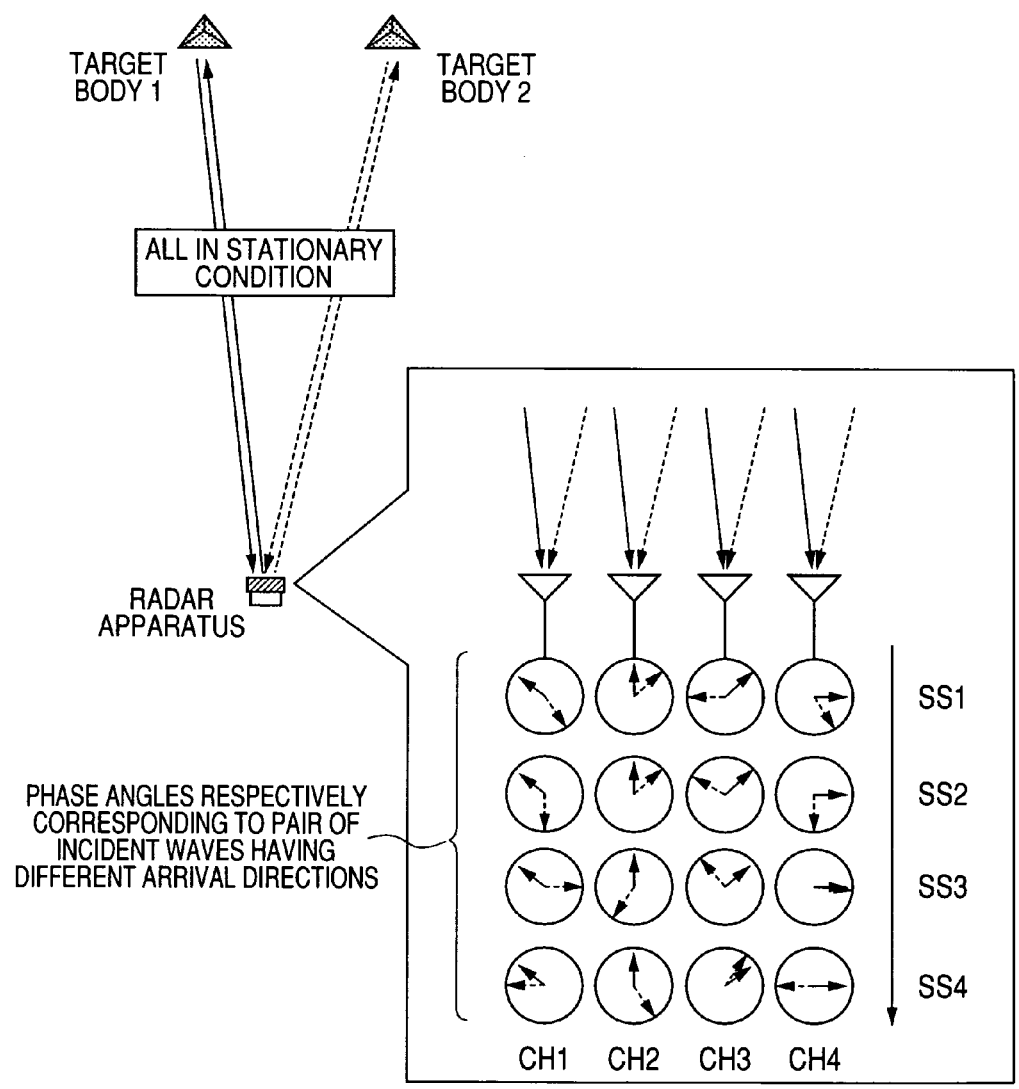
FIG. 4 is a conceptual diagram for illustrating phase relationships between respective reflected radar waves received from target objects having no relative motion, for each of a succession of transmit/receive operations of the radar apparatus, with the first embodiment.

This is conceptually illustrated in FIG. 4 for four successive snapshots SS1 to SS4. The phase angles of incident waves arriving along two different directions are respectively indicated by the full-line arrows and broken-line arrows. As can be understood from FIG. 4, since the phase of a received signal (and hence, the beat signal) of a channel is determined as a combination of phase angles of respective radar waves which are incident on the antenna element corresponding to that channel, the phase will vary between successive snapshots. Correlation between values of received signals of the respective channels is thereby suppressed, in each (time-averaged) average correlation matrix.

Hence with the above embodiment, the respective directions of a plurality of target objects which reflect radar waves can be accurately detected, even if the target objects are motionless with respect to the radar apparatus.

Furthermore this effect is achieved without requiring an increase in the number of antenna elements of the receiving antenna.

Figure 9:
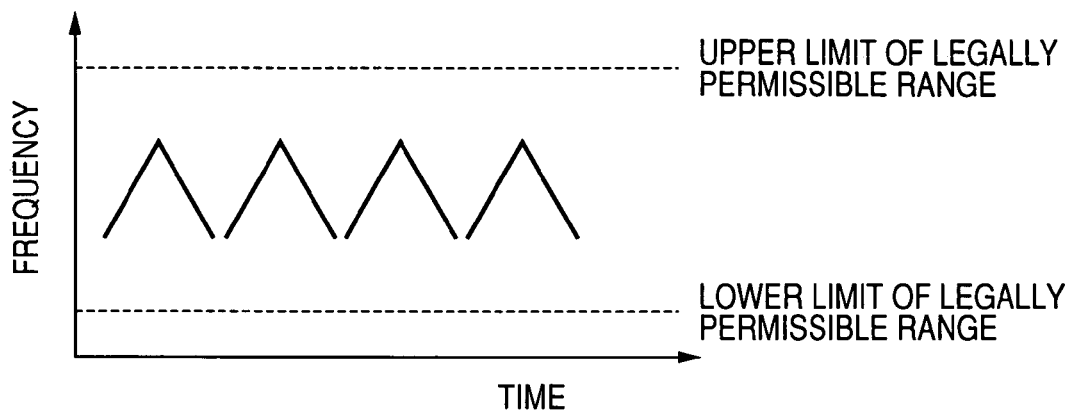
FIG. 9 illustrates successive changes in transmitted radar wave frequency with a prior art radar apparatus, and shows an example of an angular direction spectrum derived based on the MUSIC algorithm, for detecting respective directions of target objects by the prior art apparatus.
Figure 9:
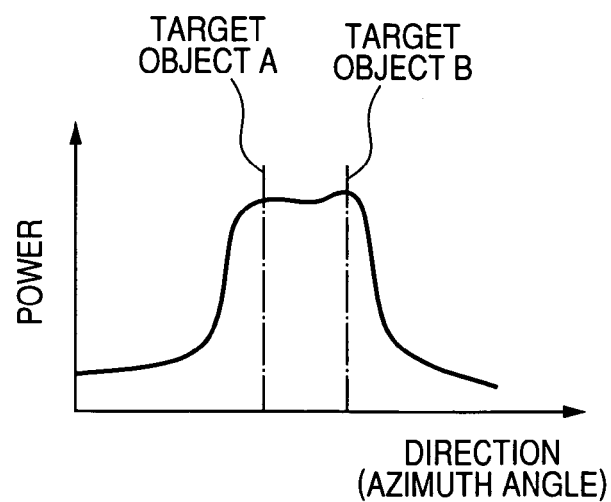

To clarify the differences between the present invention and the prior art, an example of a prior art method will be described, which attempts to achieve the above-described effects of the first embodiment. Four successive modulation intervals of a FMCW radar are shown in FIG. 9a, in which the center frequency of the sweep range (modulation frequency range) is held fixed.

It will be assumed that reflected radar waves are being received from two target objects which are motionless with respect to the radar apparatus and are close to one another, so that a single peak frequency k is obtained. In that case, when an average correlation matrix is derived by time-averaging the individual correlation matrices obtained from four successive snapshots, as proposed in the prior art, and an angular spectrum is then calculated by applying the average correlation matrix to the MUSIC algorithm as described for the above embodiment, the form of the resultant spectrum would be as illustrated in diagram (b) of FIG. 9.

As shown, due to the strong correlation between respective incident waves arriving from the target objects during each of the modulation intervals, only a single continuous peak is obtained in the spectrum, corresponding to the pair of target objects. With the above embodiment of the present invention on the other hand, a pair of peaks respectively corresponding to the two target objects will be resolved, as illustrated in diagram (b) of FIG. 3 above. This effect is obtained as a result of successively varying the center frequency of the sweep range of the transmitted radar waves at successive snapshots, as described above.

Second Embodiment

Figure 5:
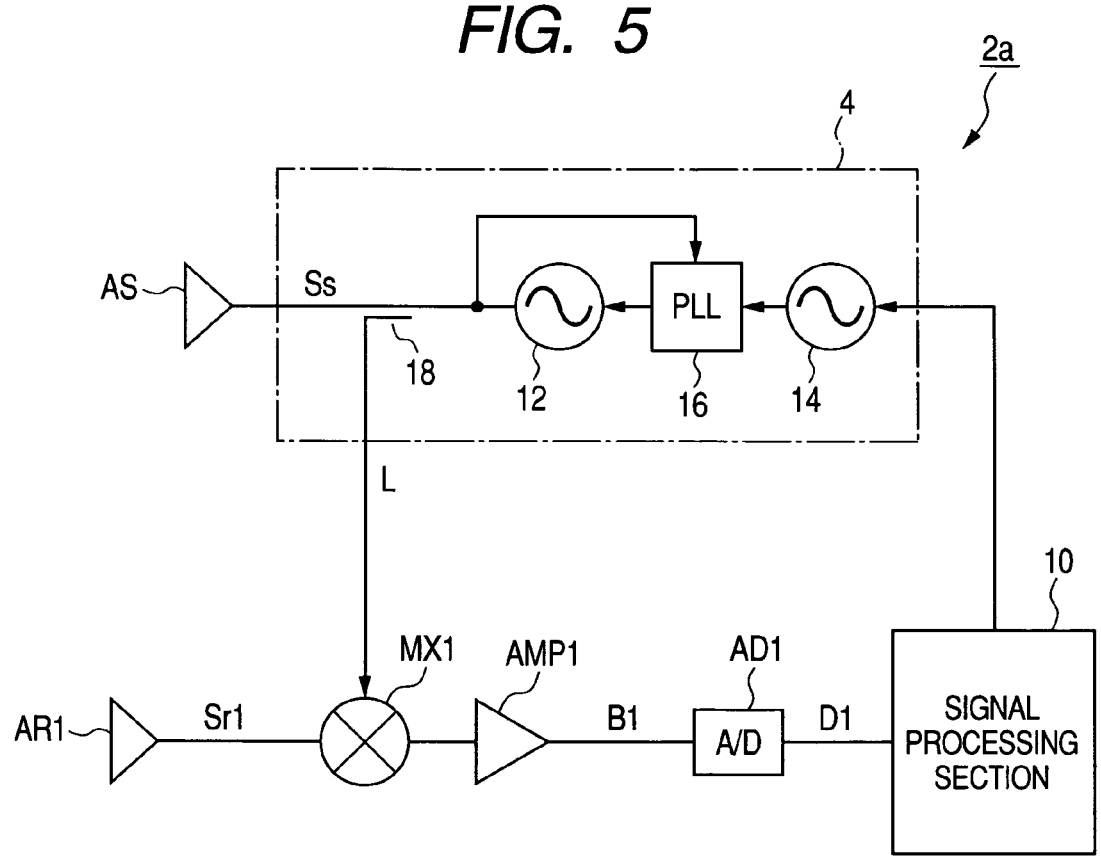
FIG. 5 is a system block diagram showing the overall configuration of a second embodiment of a vehicle-installation radar apparatus.

FIG. 5 shows the overall configuration of a second embodiment, which is a radar apparatus 2a. The radar apparatus 2a differs from the first embodiment only with respect to the receiving system and the contents of processing that is executed by the signal processing section 10, and only these different features will be described in detail in the following. With the second embodiment, a high accuracy of detecting respective relative velocities of one or more target objects can be achieved. This is done by achieving a high resolution of detecting respective component frequencies of a beat signal that is derived from a received signal.

As shown in FIG. 5 the receiving system of the radar apparatus 2a incorporates a receiving antenna AR1 formed of a single antenna element, in conjunction with a mixer MX1, an amplifier AMP1 and an A/D converter AD1. The reference signal generating circuit 14 of this embodiment is controlled to generate a reference signal which is held at a fixed frequency during each transmit/receive operation with the frequency being successively changed in successive snapshots.

Specifically, during each transmit/receive operation, the transmission signal Ss is held at a fixed frequency that is determined by the reference signal frequency. The reference signal frequency is changed in a predetermined sequence, e.g., for the sequence of four successive snapshots SN1~SN4 shown in FIG. 7a. However it should be understood that it would be equally possible to vary the reference signal frequency in a random sequence. When reflected radar waves are received from a target object having relative motion, the frequency of a resultant received signal Sr1 will differ from that of the transmission signal Ss (frequency of the local oscillator signal Lo) due to Doppler shift. The local oscillator signal Lo is mixed with the received signal Sr1 from the receiving antenna AR1 in the mixer MX1, to obtain a beat signal B1 having a frequency equal to the frequency difference between the local oscillator signal Lo and the received signal Sr1. Hence, component frequencies of the beat signal B1 correspond to respective relative velocities of one or more target objects from which reflected radar waves are being received.

The beat signal B1 is amplified by the amplifier AMP1, which also removes unwanted signal components, and is then sampled periodically at a fixed sampling frequency by the A/D converter AD1, to be converted to a series of digital data values D1.

Target Body Information Generation Processing

The target object information generation processing that is executed by the signal processing section 10 of this embodiment, to obtain the respective relative velocities of one or more target objects, will be described referring to the flow diagram of FIG. 6. This is a processing routine which is repetitively executed at fixed intervals. Firstly in step S210, a command is sent by the signal processing section 10 to the reference signal generating circuit 14 for initiating generation of the reference signal during a transmit/receive operation (to acquire data of the next snapshot), and specifying a frequency at which the reference signal is to be fixed during that transmit/receive operation.

Figure 6:
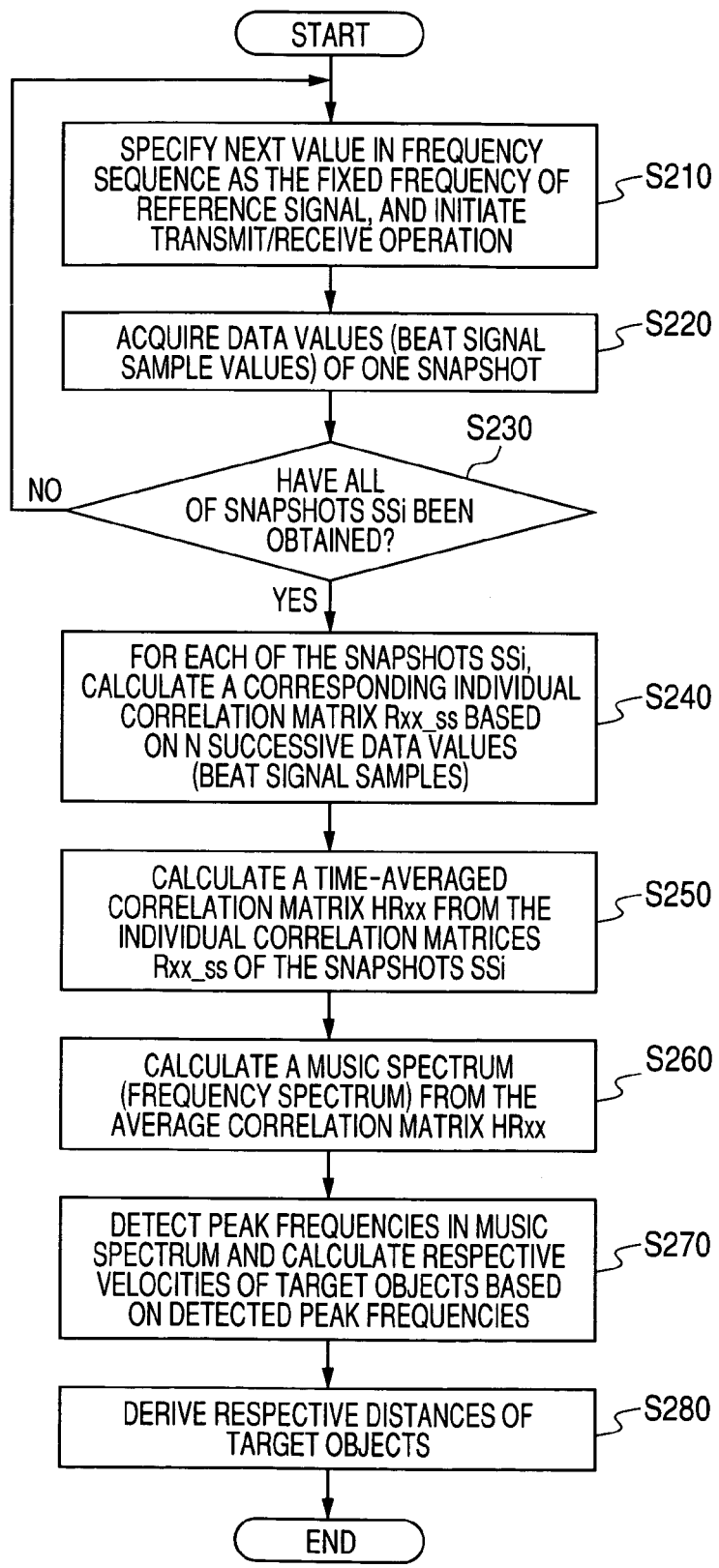
FIG. 6 is a flow diagram showing processing executed by the second embodiment for detecting respective velocities of target objects.

Each time step S210 is performed, the specified frequency is changed, with a predetermined fixed sequence of four different frequency changes being performed in each execution of the processing routine of FIG. 6. The frequency of the transmission signal Ss (frequency of the transmitted radar waves) is thereby changed accordingly at each of successive snapshot intervals.

In step S220, a set of N successive data values (where N is a predetermined fixed number), which are respective A/D converted samples of the beat signal B1, are acquired during one fixed-frequency transmit/receive operation, to constitute the data values of one snapshot, and are temporarily stored in memory.

In step S230 a decision is made as to whether a complete sequence of four successive snapshots has been obtained, i.e., as to whether all of the reference signal frequencies that can be selected by the signal processing section 10 have been successively specified.

If there is a NO decision in step S230 then operation returns to step S210, to collect data of a succeeding snapshot. If there is a YES decision in step S230, indicating that data values $D_i$ of a complete sequence of four snapshots have been collected, operation proceeds to step S240.

In step S240, for each of the snapshots $SS_i$ (in the sequence of four snapshots), the N data values which have been obtained for the snapshot are arrayed as a received vector Xi, as expressed by equation (6) below. With the second embodiment, each element of a received vector Xi expresses a beat signal (sample) value and a time-axis position within an interval of N successive sampling periods. For each snapshot, the corresponding received vector Xi is used to calculate a corresponding individual correlation matrix Rxx_ssi, as expressed by equation (7) below.

$$Xi = \{x_1, x_2, \ldots, x_N\}^T \quad (6)$$

$$Rxx\_ssi = XiXi^H \quad (7)$$

Next in step S250, an average correlation matrix HRxx is calculated from the individual correlation matrices Rxx_ssi that were calculated in step S240, with averaging (time averaging) being performed as expressed by equation (8) below.

$$HRxx = \frac{1}{4}\sum_{i=1}^{4} Rxx\_ssi \quad (8)$$

In step S260 the eigenvalues of the average correlation matrix HRxx are applied in determining the number L of respectively different component frequencies of the beat signal B1 (component frequencies corresponding to respective relative velocities of L different target objects from which reflected waves are being received). A MUSIC spectrum is then derived as described for step S150 of the first embodiment above. However with the second embodiment, a frequency spectrum is obtained having values of beat signal frequency along the horizontal axis, in which peak values correspond to respective component frequencies of the beat signal B1. The relative velocities of respective target objects are then calculated based on these detected beat frequency peak values. (Step S270).

This execution of the processing routine is ended.

Figure 7:
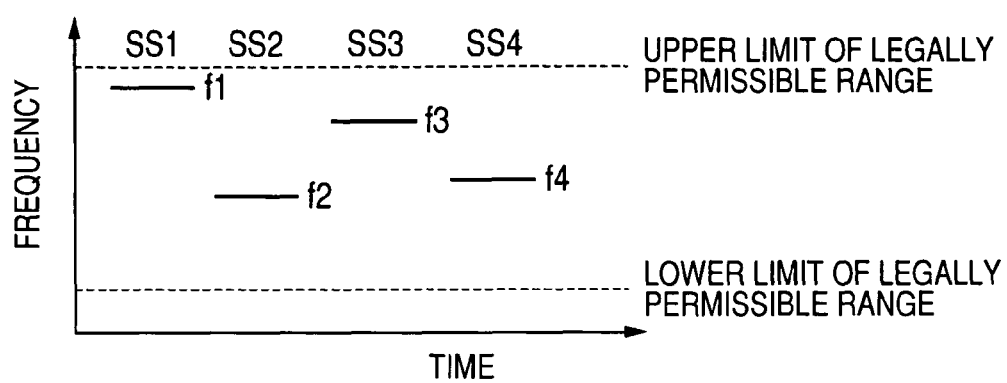
FIG. 7 illustrates successive changes in transmitted radar wave frequency with the second embodiment, and shows an example of a beat frequency spectrum derived based on the MUSIC algorithm, for detecting respective relative velocities of target objects with the second embodiment.
Figure 7:
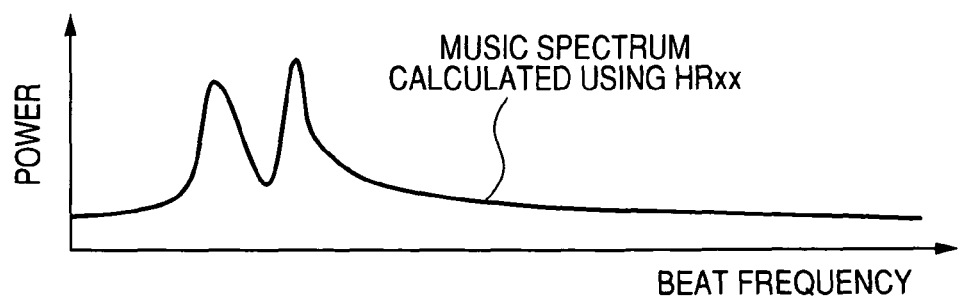

Velocity detection by the second embodiment is illustrated in diagram (b) of FIG. 7, for the case of two target objects having respectively different relative velocities with respect to the radar apparatus, so that two MUSIC spectrum peaks are produced.

Effects

With the radar apparatus 2a of the second embodiment, as for the radar apparatus 2 of the first embodiment, a correlation matrix Rxx_si is obtained each time a transmit/receive operation is executed, i.e., at each snapshot. However with the second embodiment, each correlation matrix Rxx_si is derived from a received vector formed of a fixed number (N) of successive samples of the received signal (beat signal) of a single channel. The transmission frequency of the radar apparatus is changed at each snapshot interval, in a fixed sequence of four different frequencies. When a sequence of four snapshots has been completed, the four correlation matrixes Rxx_si corresponding to the respective snapshots are time-averaged to obtain an average correlation matrix HRxx.

Hence with the second embodiment, as described for the first embodiment, the effects of a strong correlation between received radar waves can be effectively suppressed, by deriving an average correlation matrix HRxx through time-averaging of four successively obtained individual correlation matrixes, and applying eigenvalues of the average correlation matrix to the MUSIC algorithm.

With the first embodiment, this enables a high resolution of detecting the respective directions of a plurality of target objects which are located close together, even if the target objects are stationary with respect to the radar apparatus.

With the second embodiment, high accuracy can be achieved in detecting the respective velocities of one or more target objects which have relative motion with respect to the radar apparatus.

In general, with prior art types of radar apparatus which detect target object velocities based upon a beat signal that is derived from a received signal resulting from reflected radar waves, FFT processing is applied directly to the sampled (A/D converted) beat signal. This is done to obtain a frequency spectrum containing peaks which correspond to respective component frequencies of the beat signal. However with the second embodiment described above, in which a time-averaged correlation matrix is directly obtained from beat signal sample values and is applied to detect the component frequencies of the beat signal, a higher accuracy of velocity detection can be achieved than is possible with prior art methods.

Other Embodiments

Figure 8:
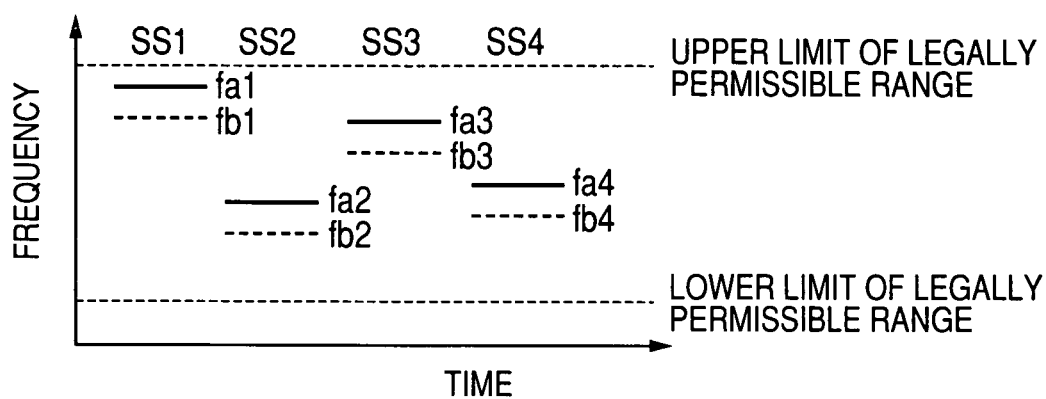
FIG. 8 illustrates successive changes in transmitted radar wave frequency with an alternative form of the second embodiment, and shows an example of beat frequency spectrums derived based on the MUSIC algorithm, for detecting respective relative velocities of target objects with the alternative form of the second embodiment.
Figure 8:
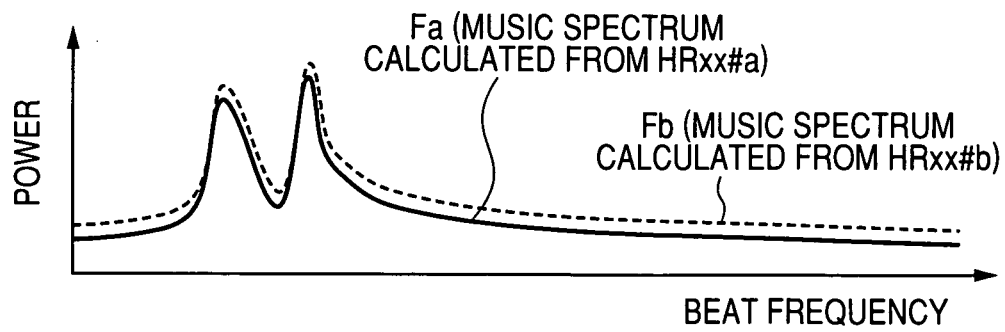

An alternative form of the second embodiment will be described in the following. With the second embodiment, radar waves at a single fixed frequency are transmitted during each snapshot interval, with the frequency value being changed for successive snapshots. However it would be equally possible for radar waves to be transmitted at a plurality of respectively different fixed frequencies during each snapshot interval, with the frequencies being changed at successive snapshots. This is illustrated in diagram (a) of FIG. 8, for the case of two transmission frequencies being applied during each of four snapshots SS1 to SS4, with radar waves being transmitted at frequencies fai and fbi during each snapshot (fbi is lower than fai, and i is a snapshot identifier in the range 1 to 4). With this alternative embodiment, two average correlation matrixes HRxx#a and HRxx#b are derived from a set of four successive snapshots SSi. A corresponding pair of spectrums relating beat frequency values to signal power can thereby be obtained by respectively applying the average correlation matrices HRxx#a and HRxx#b to the MUSIC algorithm, as illustrated in diagram (b) of FIG. 8. Respective relative velocities and distances of target bodies can thereby be obtained.

Furthermore, as an alternative to using CW or FMCW radar, it would be possible to apply the invention to a known type of pulse radar apparatus for measuring the distance of a target object. Such an apparatus transmits successive pulses of radar waves in respectively corresponding measurement periods, with the delay time between the transmission of a pulse and reception of resultant reflected waves being calculated based on the correlation between a gate signal (i.e., a signal which is delayed with respect to a transmitted pulse) and a received signal pulse.

With the method of the present invention applied in such a case, the frequency of the waves constituting a transmitted pulse would be changed for each successive measurement period. In addition, in each measurement period, the received signal would be sampled to obtain values for constituting a received vector (to thereby derive an individual correlation matrix corresponding to that measurement period) with the samples being obtained during an interval extending from start to end of a specific part of the measurement period, i.e., a part in which correlation between incident radar waves arriving along different directions is a maximum. Successive individual correlation matrices can thereby be obtained corresponding to respective measurement periods, and time-averaged correlation matrices obtained from these, as described for the above embodiments.

Furthermore with the first embodiment, a receiving system having a single transmitting antenna element (single transmission channel) and a plurality of receiving channels is utilized. However it would be equally possible to utilize a transmitting antenna having a plurality of antenna elements, corresponding to respective channels.

A third embodiment will be described in the following. This is a modified form of the first embodiment, i.e., a FMCW radar apparatus, with the configuration differing only in that the signal processing section 10 of the third embodiment is supplied with information which indicates the current running speed of the local vehicle.

Figure 10:
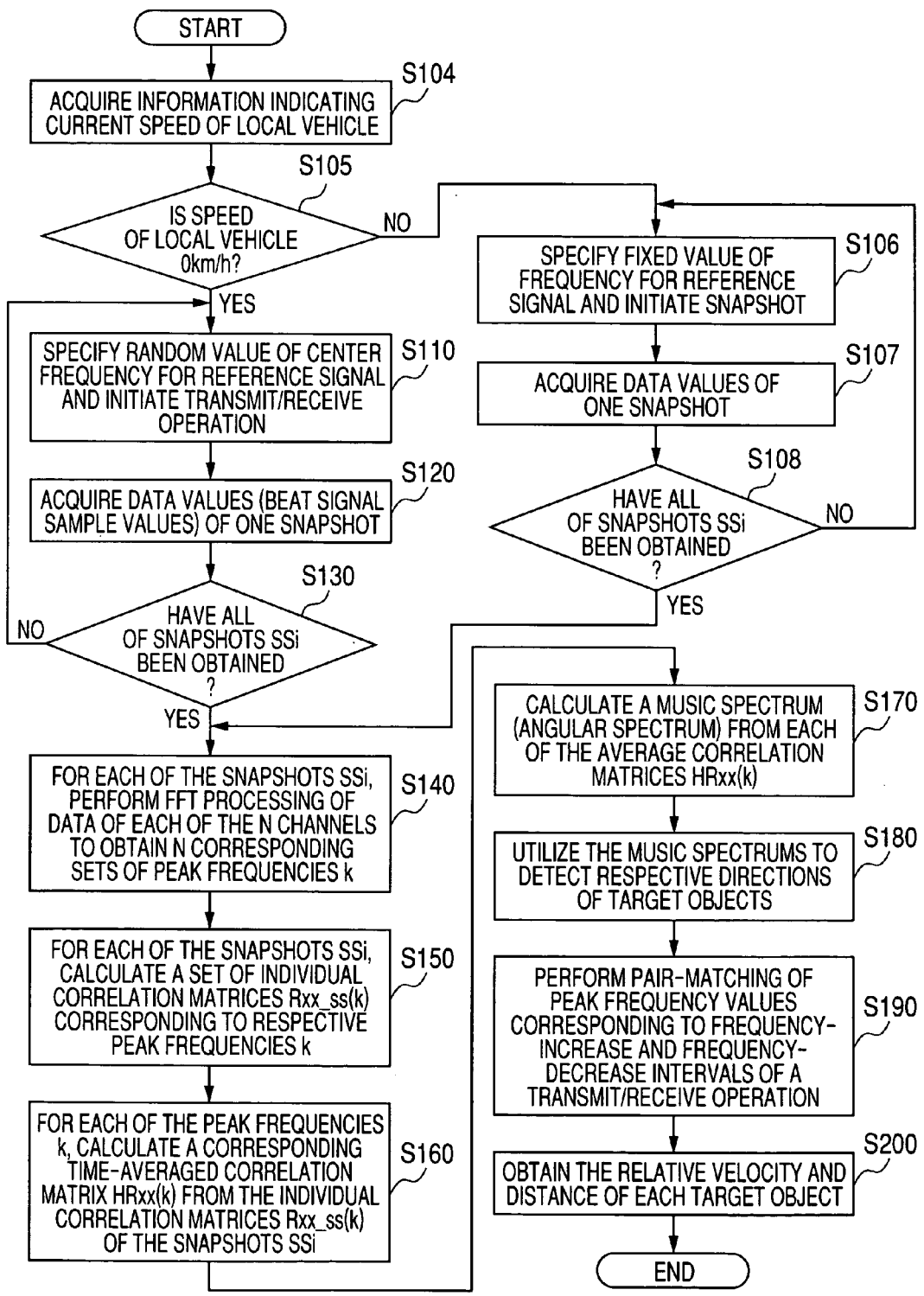
FIG. 10 is a flow diagram showing processing executed by a third embodiment of a vehicle-installation radar apparatus, for detecting respective directions of target objects.

FIG. 10 is a flow diagram of a processing routine that is executed periodically by the signal processing section 10 of the third embodiment. After vehicle motion information has been received (step S104) a decision is made (step S105) as to whether the local vehicle is currently halted. If it is halted, then steps S110 to S200 are executed as described for the first embodiment referring to FIG. 2. That is to say, in S110, the center frequency of the reference signal sweep range (upward/downward frequency sweep) to be used in the next snapshot is specified, thereby determining the center frequency of the sweep range of the transmitted radar waves in the next snapshot. It will be assumed that with this embodiment the specified center frequency is randomly selected for each successive snapshot (each successive transmit/receive operation).

Figure 11:
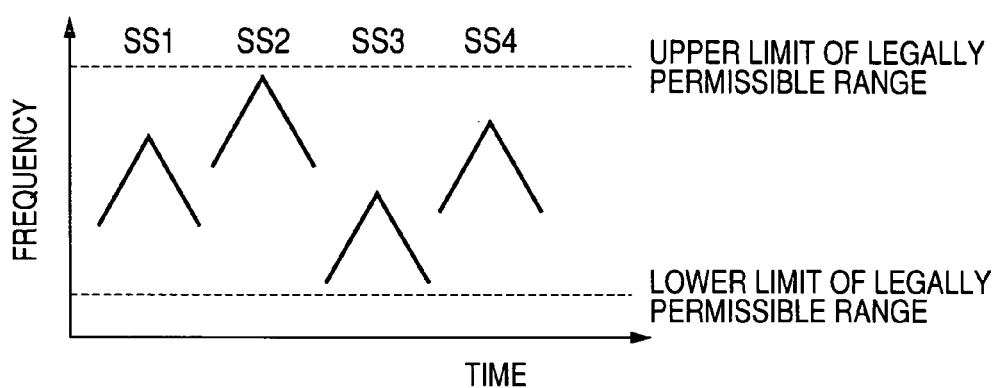
FIG. 11 illustrates successive changes in transmitted radar wave frequency, with the third embodiment, under a condition in which a vehicle conveying the apparatus is halted, and under a condition in which the vehicle is in motion, respectively; and, FIGS. 12A and 12B constitute a flow diagram showing details of processing steps of FIG. 2 and FIG. 10, executed by each of the first and third embodiments.
Figure 11:
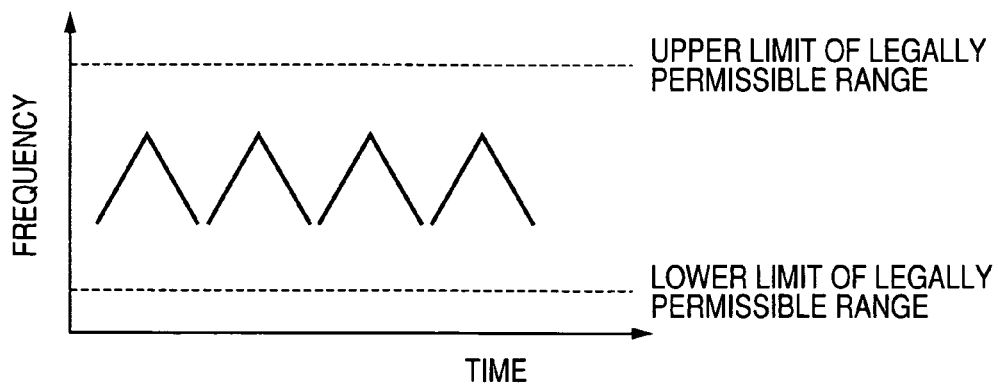

The transmission frequency sweeps that might be executed for a sequence of four snapshots SS1 to SS4 are illustrated in diagram (a) of FIG. 11. When it is judged in step S130 that a four successive snapshot have been acquired, steps S140 to S200 are then executed as described for the first embodiment.

However if it is judged in step S105 that the local vehicle is in motion (i.e., YES decision) then step S106 is executed, in which a predetermined fixed frequency is specified as the center frequency for the reference signal sweep range. Step S107 (corresponding to step S120, described hereinabove for the first embodiment) is then executed. If it is judged in step S108 that a sequence of four successive snapshots has been completed, the sequence of steps S140 to S200 (respectively identical to steps S140 to S200 of the first embodiment) is then executed as described for the first embodiment.

With this embodiment, the transmission frequency sweeps which are executed in a sequence of four snapshots SS1 to SS4, when the local vehicle is halted, are illustrated in diagram (b) of FIG. 11. As shown, each upward/downward frequency sweep range of the transmitted radar waves is located at the same position on the frequency axis, for each of successive modulation intervals. Specifically, the center frequency of the reference signal produced by the reference signal generating circuit 14 is held fixed in this condition.

The basis for this embodiment is as follows. In general, when a vehicle is being used in traffic and becomes halted, preceding vehicles will also become halted, so that there will be strong correlation between respective reflected radar waves received from preceding vehicle, as well as between waves which may be reflected from respective fixed objects near the road. When the local vehicle is in motion however, the problem of correlation between received incident waves does not arise, and hence successive changing of the transmitted wave frequency becomes unnecessary. Thus with this embodiment the center of the transmission frequency sweep range is changed for successive modulation intervals only while the local vehicle is halted.

It will be apparent that the second embodiment could be similarly modified.

It should be noted that the invention is not limited to the above-described embodiments, and that various alternative forms could be envisaged which fall within the scope claimed for the invention. Furthermore although the invention has been described based on embodiments of a vehicle-installation radar apparatus, the invention is not limited to such a type of application.

What is claimed is:

1. A target object detection apparatus for deriving target object information relating to one or more target objects, comprising transmitting and receiving circuitry configured to repetitively execute a transmit/receive operation of transmitting scanning electromagnetic waves and obtaining received signals based on reflected waves respectively reflected from said target objects;

correlation matrix generating circuitry configured to successively generate an individual correlation matrix based on said received signals, during each of a fixed plurality of successive transmit/receive operations, and to calculate an average correlation matrix as a time-average of a plurality of individual correlation matrices respectively corresponding to said fixed plurality of transmit/receive operations; and target object information detection circuitry configured to derive said target object information by a calculation based upon said average correlation matrix, wherein in at least one of said fixed plurality of successive transmit/receive operations, a frequency of said transmitted scanning electromagnetic waves is made different from respective values of said frequency during each of remaining ones of said fixed plurality of transmit/receive operations.

2. A target object detection apparatus according to claim 1, wherein said transmitting and receiving circuitry comprises an array antenna comprising a plurality of antenna elements, and a plurality of received signals are obtained via respective channels corresponding to said antenna elements: wherein said correlation matrix generating circuitry is configured to calculate each of said individual correlation matrices based on a received vector having element values comprising respective concurrent values of said received signals corresponding to said channels; and said target object information detection circuitry is configured to calculate said target object information as respective relative directions of said target objects based upon said average correlation matrix.

3. A target object detection apparatus according to claim 2, wherein:

said transmitting and receiving circuitry is configured to transmit said scanning electromagnetic waves as FMCW (frequency-modulation continuous-wave) waves having a transmission frequency which is varied linearly within a predetermined variation range during each operation of said plurality of transmit/receive operations, and to change a center frequency of said variation range at each of successive transmit/receive operations;

designating N as a number of said channels, said received signals comprise N beat signals respectively corresponding to said channels;

said transmitting and receiving circuitry comprises A/D (analog-to-digital) converter circuitry for converting said N beat signals to N respective sets of data values, during each of said plurality of transmit/receive operations; and said correlation matrix generating circuitry is configured to apply frequency analysis processing to each of said N sets of data values obtained from a transmit/receive operation, to thereby derive a peak frequency and N peak amplitude values each corresponding to said peak frequency, and to array said N data values as a received vector corresponding to said transmit/receive operation, and to thereby derive received vectors each corresponding to said peak frequency and respectively corresponding to said plurality of transmit/receive operations, and to calculate an average correlation matrix, corresponding to said peak frequency, as an average of said received vectors.

4. A target object detection apparatus according to claim 2, wherein:

said target object information detection circuitry is configured to derive an angular spectrum by applying eigenvalues of said average correlation matrix in a super-resolution algorithm, and to detect said relative directions as respective peak values of said angular spectrum.

5. A target object detection apparatus according to claim 1, wherein:

said correlation matrix generating circuitry is configured to generate each of said individual correlation matrices based on a received vector comprising a fixed plurality of time-sequential values of a received signal obtained from a single antenna element of a receiving antenna of said transmitting and receiving circuitry; and said target object information detection circuitry is configured to calculate respective relative velocities of said target objects, based upon said average correlation matrix.

6. A target object detection apparatus according to claim 5, wherein:

said transmitting and receiving circuitry is configured to transmit said scanning electromagnetic waves as CW (continuous-wave) waves with a fixed transmission frequency during each of said transmit/receive operations, and to change said transmission frequency at each of successive transmit/receive operations;

said received signal is a beat signal derived from an output signal of a receiving antenna of said transmitting and receiving circuitry, and said transmitting and receiving circuitry comprises A/D (analog-to-digital) converter circuitry configured to convert said beat signal to successive data values; and said correlation matrix generating circuitry is configured to establish each of said received vectors as an array of time-sequential ones of said data values, acquired in a transmit/receive operation corresponding to said received vector.

7. A target object detection apparatus according to claim 5, wherein:

said target object information detection circuitry is configured to:

derive a frequency spectrum based on applying eigenvalues of said average correlation matrix in a super-resolution algorithm;

detect said respective peaks of said frequency spectrum; and calculate said relative velocities based upon peak frequencies respectively corresponding to said peaks.

8. A target object detection apparatus according to claim 1, wherein said scanning electromagnetic waves are selected from a group comprising FMCW (frequency-modulation continuous-wave) waves having a frequency-modulated carrier wave, CW (continuous-wave) waves having an unmodulated carrier wave, and pulse waves having a periodically interrupted carrier wave.

9. A target object detection apparatus according to claim 8, wherein said scanning electromagnetic waves are FMCW waves and said transmitting and receiving circuitry comprises a PLL (phase lock loop) circuit configured to vary a frequency of said carrier wave.

* * * * *